United States Patent
Kulis, Jr. et al.

(10) Patent No.: US 8,157,063 B2
(45) Date of Patent: Apr. 17, 2012

(54) NOISE ATTENUATING FRICTION ASSEMBLY

(75) Inventors: Stanley F. Kulis, Jr., Cookeville, TN (US); Rodney G. Silvey, Cookeville, TN (US); Jason H. Mahan, Lafayette, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 1701 days.

(21) Appl. No.: 10/967,040

(22) Filed: Oct. 15, 2004

(65) Prior Publication Data

US 2005/0082124 A1    Apr. 21, 2005

Related U.S. Application Data

(60) Provisional application No. 60/511,898, filed on Oct. 16, 2003.

(51) Int. Cl.
*F16D 69/00* (2006.01)
*F16D 65/14* (2006.01)

(52) U.S. Cl. ............ 188/250 B; 188/250 R; 188/250 E

(58) Field of Classification Search ............. 188/250 B, 188/251 R, 250 R, 253, 256
See application file for complete search history.

(56) References Cited

U.S. PATENT DOCUMENTS

| | | | |
|---|---|---|---|
| 3,275,105 A | 9/1966 | Petit | 188/250 |
| 5,413,194 A | 5/1995 | Kulis, Jr. et al. | 188/251 A |
| 5,456,339 A | 10/1995 | Zeng | 188/250 E |
| 5,515,950 A * | 5/1996 | Kwolek | 188/73.36 |
| 5,538,104 A * | 7/1996 | Katz et al. | 188/73.1 |
| 6,182,799 B1 | 2/2001 | Reuter et al. | 188/71.1 |
| 6,283,258 B1 | 9/2001 | Chen et al. | 188/250 E |
| 6,405,840 B1 * | 6/2002 | Foster et al. | 188/250 B |

FOREIGN PATENT DOCUMENTS

| | | |
|---|---|---|
| EP | 0 694 708 | 1/1996 |
| GB | 1 275 306 | 5/1972 |

* cited by examiner

*Primary Examiner* — Melody Burch
(74) *Attorney, Agent, or Firm* — Robert L. Stearns; Dickinson Wright, PLLC

(57) ABSTRACT

A brake pad assembly (10) comprising a molded material (26) affixed to a backing plate (12) having opposed faces (14, 16), one or more non-circular extrusion openings (24, 38) through its thickness, and tab-like extensions (22) or other integral attachment for incorporating the assembly (10) by location and support into a vehicle brake system. The molded material (26) extends over both opposed faces (14, 16) of the backing plate (12) by being extruded through the extrusion openings (24, 38) to provide a unitary structure wherein molded material (26) at one side of the backing plate (12) functions as a friction-generating pad material (28) and the portion of the molded material (26) at the opposite side of the backing plate (12) functions as the assembly shim-like noise attenuating element (32) due to vibration damping properties. The number, configuration, and placement of the extrusion openings (24, 36) through the thickness of the backing plate (12) is varied to alter the noise attenuating properties of the assembly (10), further reducing the tendency for modal locking of brake components.

15 Claims, 4 Drawing Sheets

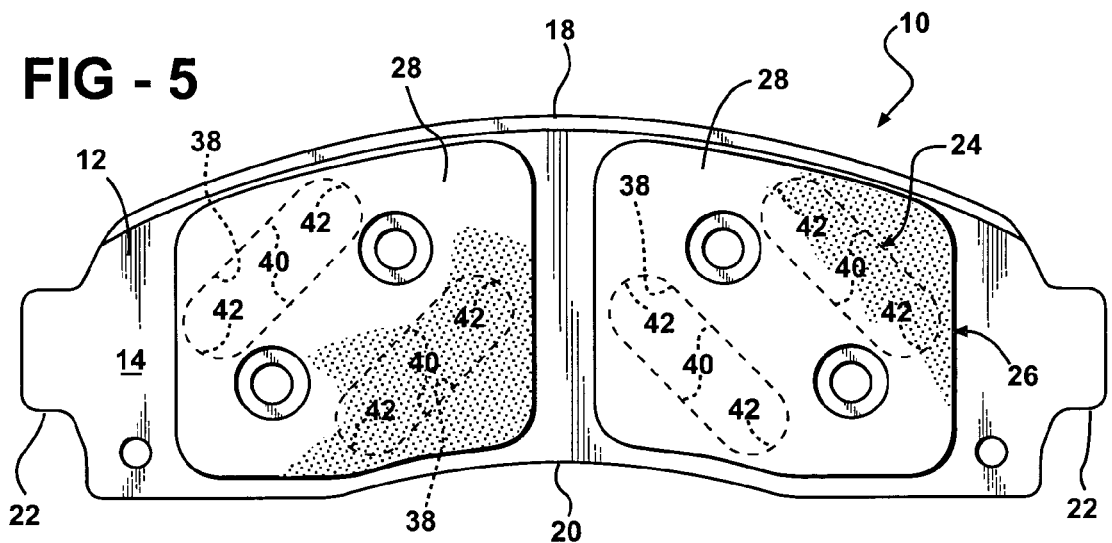
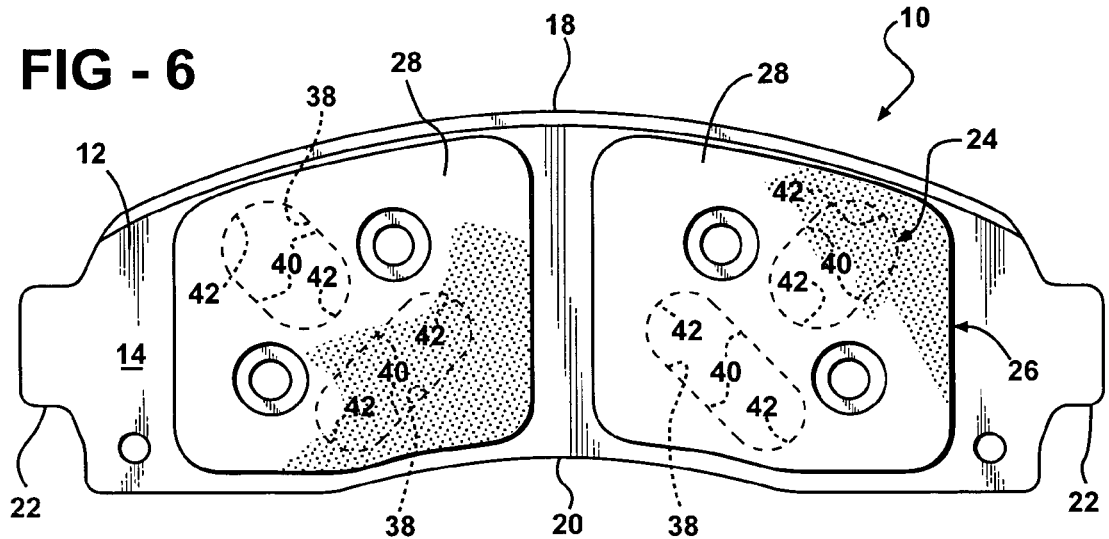

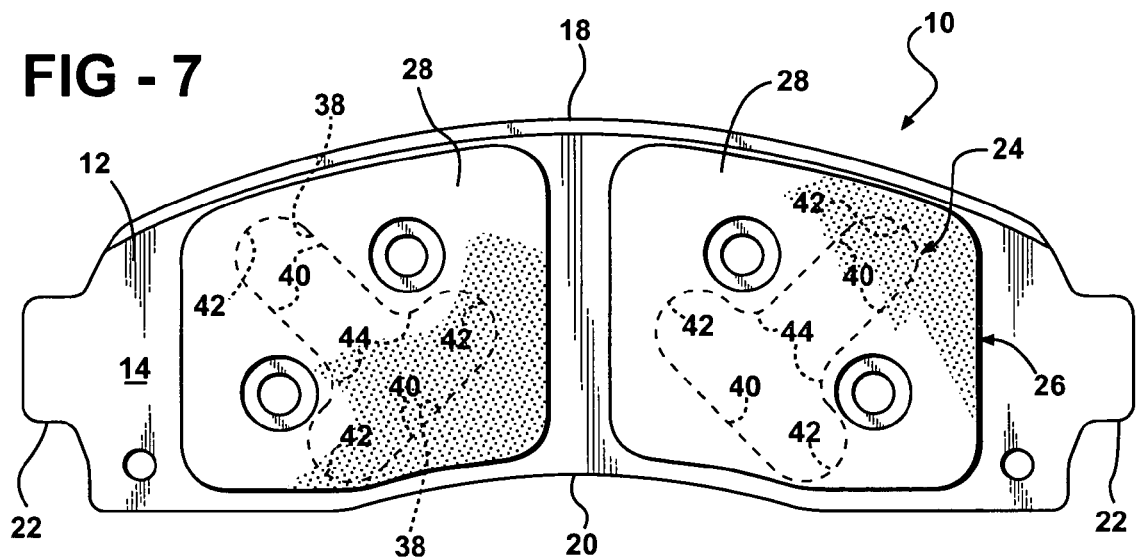
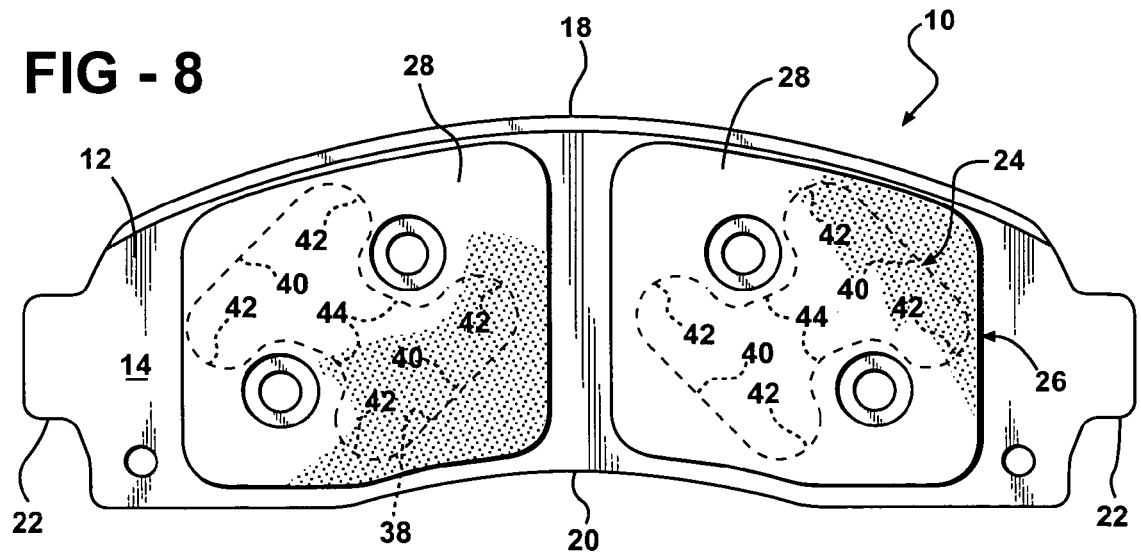

NOISE ATTENUATING FRICTION ASSEMBLY

BACKGROUND OF THE INVENTION

This application claims priority to U.S. Provisional Application No. 60/511,898 filed Oct. 16, 2003.

FIELD OF THE INVENTION

The present invention relates generally to brake friction pad assemblies such as are used in various automotive vehicle brake applications, including disc brake systems and drum brake systems. These systems may be utilized in automobiles, trucks, buses, off road equipment, airplanes, industrial machinery, etc. More particularly, it concerns an improved brake friction pad assembly structured to significantly reduce brake noise generated during brake system operation, and methods of making the improved brake friction pad assembly.

RELATED ART

Vibrations in a brake friction pad assembly generated during brake system operation frequently result in an audible squealing noise which may be objectionable and/or alarming to an operator, even though the noise may not result from any functionally problematic condition. In some situations, vibrations in a brake friction pad assembly may even contribute to premature or uneven wear of the abrasion surfaces. In any event, excessive brake vibration and noise is generally undesirable and many prior art techniques have been proposed for reducing or dampening vibrations in a brake friction pad assembly.

Notable examples of prior art attempts to reduce noise in a brake pad assembly include cutting sinusoidal grooves in the backing plate, as shown in U.S. Pat. No. 6,283,258 to Chen et al., and sculpturing of the friction-generating pad as shown in U.S. Pat. No. 5,456,339 to Zeng. These prior art techniques introduce undesirable side effects, however, such as increasing the time cycle of the fabrication process and/or adding cost to the brake/drum assembly.

One particularly effective method of attenuating brake noise without introducing these undesirable side effects consists of incorporating a shim onto the rear surface of the backing plate. The shim can be integrally molded from the flow of mix extruded through openings in the backing plate, as shown in U.S. Pat. No. 5,413,194 to Kulis, Jr. et al., hereby incorporated by reference in its entirety, or affixed in a subsequent operation. In the '194 Kulis, Jr. patent, the friction material mix or under-layer mix flows via an extrusion process into the openings in the backing plate, and in an alternative embodiment flows behind the backing plate to form an integral noise shim.

In the '194 Kulis, Jr. patent, the extrusion openings in the backing plate through which the friction material mix or under-layer mix flows are circular. The circular holes are utilized due to ease of manufacture through a punch process and the low cost of readily available round-shaped punch tools. In some braking applications, vibrations traversing the length of the backing plate are a source of objectionable brake noise generation, and the shim on the rear surface of the backing plate is not sufficient to satisfactorily attenuate the objectionable vibrations.

Accordingly, within a friction brake pad assembly having extrusion openings in the backing plate into which the friction material mix or under-layer mix are pressed during the forming operation, such as shown in the '194 Kulis, Jr. patent, there exists a need to provide additional noise attenuating properties without introducing features that increase the cost of the backing plate nor increase the time cycle of the fabrication process.

SUMMARY OF THE INVENTION

A brake friction pad assembly according to this invention comprises a rigid backing plate having a length and a thickness between opposed first and second faces. The backing plate is capable of transmitting vibrations along its length and width. The backing plate includes a primary extrusion opening extending between its opposed faces. A friction-generating pad element made from a molded material is pressed into contact with the first face of the backing plate such that the molded material fills the primary extrusion opening. The primary extrusion opening has a non-circular shape so that vibrations traveling the length of the backing plate are substantially dampened upon encountering the non-circular shape of said primary extrusion opening.

The invention also contemplates a method of dampening vibrations traveling through a brake friction pad assembly for a caliper-type vehicular disc brake system comprising the steps of: forming a rigid backing plate with a primary extrusion opening extending there through and at least two spaced mounting features on generally opposing sides of the primary extrusion opening; pressing a molded material onto a first face of the backing plate to form a friction-generating pad element and simultaneously filling the primary extrusion opening with the molded material; generating vibrations in the backing plate between the spaced mounting features; and forcing the vibrations to travel in a non-arcuate path as they find their way around the periphery of the primary extrusion opening to thereby dampen the vibrations within the friction pad assembly.

It has been discovered that in friction brake pad assembly having extrusion openings in the backing plate into which the friction material mix or an under-layer mix are pressed during the forming operation, vibrations traveling across the backing plate will be substantially dampened by forming the primary extrusion opening with a non-circular shape. It is hypothesized that this advantageous effect is realized by the introduction of reflecting surfaces caused by the non-circular peripheral edges of the primary extrusion opening. This is in contrast to the prior art circular openings which are believed to allow mechanical waves to flow too efficiently around their periphery as they travel across the length and/or width of the backing plate.

In alternative embodiments of the present invention, the number, configuration, and placement of the extrusion openings through the thickness of the backing plate are varied to alter the natural vibrational frequency and noise attenuating properties of the friction brake pad assembly.

BRIEF DESCRIPTION OF THE DRAWINGS

These and other features and advantages of the present invention will become more readily appreciated when considered in connection with the following detailed description and appended drawings, wherein:

FIG. 5 is a front elevation view as in FIG. 4 wherein the primary extrusion opening and three secondary extrusion openings are formed in the shape of pairs of parallel elongated slots;

FIG. 6 is a front elevation view as in FIG. 5 wherein the primary extrusion opening and three secondary extrusion openings are formed in the shape of pairs of perpendicular elongated slots;

FIG. 7 is a front elevation view as in FIG. 4 wherein the primary extrusion opening is formed in the shape of a "T", and a secondary extrusion opening is formed in the shape of a "T" mirrored in orientation to the primary extrusion opening; and FIG. 8 is a front elevation view as in FIG. 4 wherein the primary extrusion opening is formed in the shape of an "H", and a secondary extrusion opening is formed in the shape of an "H" mirrored in orientation to the primary extrusion opening.

DETAILED DESCRIPTION OF THE PREFERRED EMBODIMENT

Figure 1:
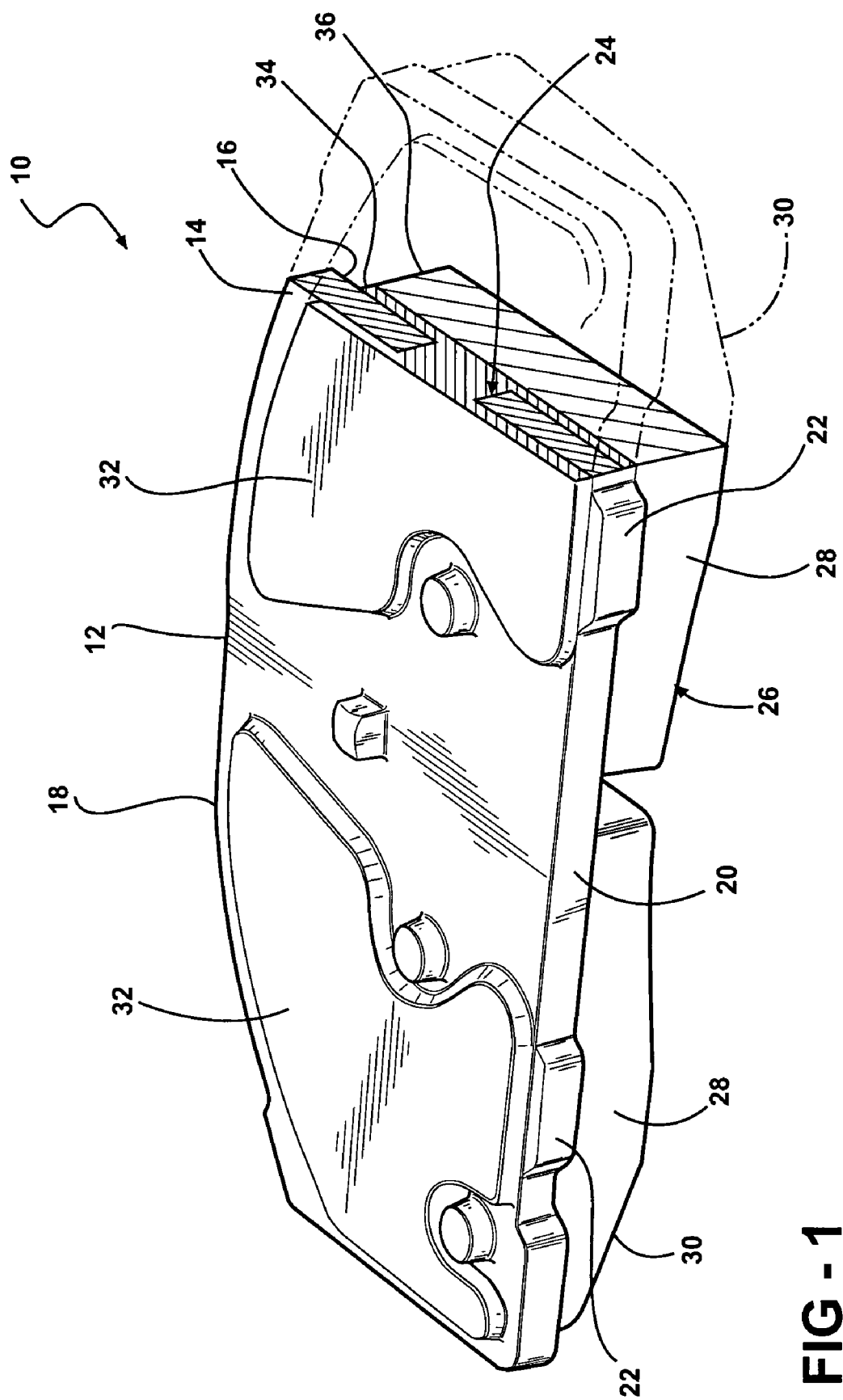
FIG. 1 is a cut-away perspective view a brake pad assembly according to the subject invention in which the friction-generating pad element is fabricated from a first material mixture formulation, and the noise-damping pad element is fabricated from a second material mixture formulation.

Referring to the Figures, wherein like numerals indicate like or corresponding parts throughout the several views, a disc brake friction pad assembly according the subject invention is generally shown at 10 in FIG. 1.

The assembly 10 includes a rigid backing plate 12, which in the preferred embodiment is made from a steel material. The backing plate 12 has a length and a thickness between opposed first 14 and second 16 faces. The first face 14 is that surface of the backing plate 12 presented toward a rotor when operationally mounted in a vehicular caliper -type braking assembly. The first face 14 is generally planar and second face 16 is also generally planar and parallel to the first face 14. The backing plate 12 further includes a top edge 18 and bottom edge 20 spaced from the top edge 18. The top 18 and bottom 20 edges extend lengthwise of the backing plate 12 and form its upper and lower peripheral boundaries when operationally mounted in a vehicular caliper-type braking assembly. At least two spaced mounting features 22 are formed in the backing plate 12 for supporting the assembly 10 within a brake caliper system. In FIG. 1, the mounting features are illustrated as simple profile features of the backing plate 12, whereas in FIGS. 4-8 the mounting features 22 are shown as lug-shaped ears extending in opposite lengthwise directions from the backing plate 12. Other mounting feature configurations are possible, as will be dictated by the brake system design.

The backing plate 12 also includes a primary extrusion opening, generally indicated at 24, extending between its opposed first 14 and second 16 faces. The primary extrusion opening 24 is non-circular in shape, and may be skewed in its orientation relative to the top 18 and bottom 20 edges. The primary extrusion opening 24 is described in greater detail below.

Figure 2:
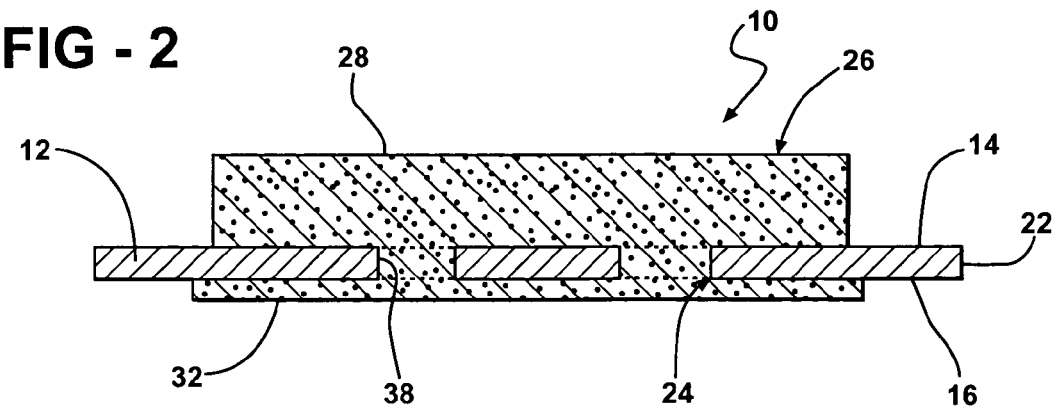
FIG. 2 is a simplified cross-sectional view of a brake pad assembly in which the friction-generating pad element and the noise-damping pad element are fabricated from the same material mixture formulation.
Figure 3:
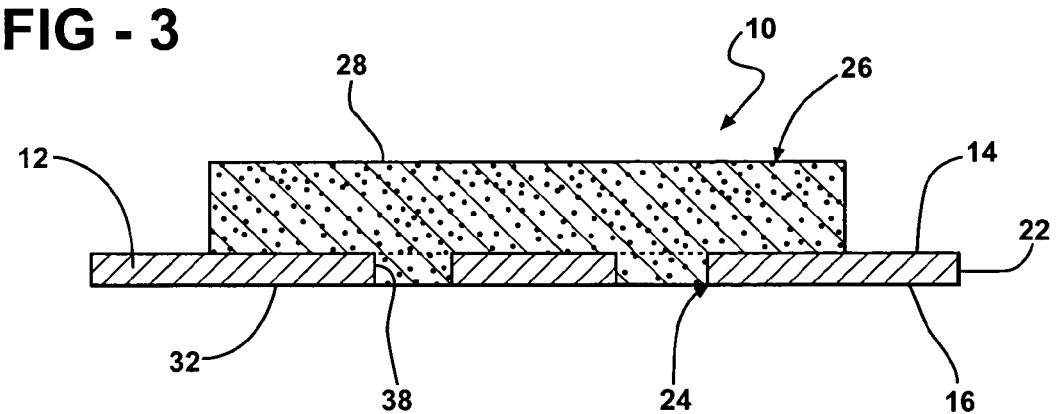
FIG. 3 is a simplified cross-sectional view of a brake pad assembly which does not include a integrally molded noise-damping pad element.

A molded material, generally indicated at 26, is pressed into contact with the first face 14 of the backing plate 12 such that the molded material 26 forms a friction-generating pad element 28 over the first face 14 while simultaneously filling the primary extrusion opening 24. As shown in FIGS. 1 and 4-8, the friction-generating pad element 28 can be formed in two or more distinct segments on the backing plate 12, or in a single section as shown in FIGS. 2 and 3. In the case of two or more segments, depending upon the magnitude of expected braking system noise-damping requirements, each pad segment may have different planar configurations, different planar areas, or different thicknesses. Thus, the friction-generating pad element 28 can include contour features 30 on its engagement surface to further tune the noise attenuating characteristics of the assembly 10. Although not necessary, it is preferable that each such friction-generating pad segment 28 be associated with a different extrusion opening 24 in the backing plate 12.

Preferably, although not necessarily, a noise-damping pad element 32 overlies and contacts a substantial portion of the second face 16 of said backing plate, as shown in FIG. 1. The noise-damping pad element 32 is joined to the friction-generating pad element 28 by the molded material 26 contained within the primary extrusion opening 24.

As shown in FIG. 1, the friction-generating pad element 28 portion of the molded material 26 can be fabricated from a first material mixture formulation 34, whereas the portion of molded material 26 contained within the primary extrusion opening 24 and the noise- damping pad element 32 is fabricated from a common, generally homogenous second material mixture formulation 36 having more readily flowable extrusion properties than the first material mixture formulation 34. Examples of suitable first 34 and second 36 material mixture formulations of the molded material 26 may be had by reference to the above-referenced U.S. Pat. No. 5,413,194 to Kulis, Jr. et al. Regardless of the material selected for the second material mixture formulation 36, its properties should be chosen to provide the properties of a thermal insulator and/or vibration attenuation.

Although not shown in the Figures, one or more optional additional intermediate layers of molding material 26 can be introduced, each integrally joined with one another and to the backing plate 12 at the time of material molding. The intermediate layer will typically have either thermal resistive properties and/or noise attenuating properties.

As shown in FIG. 2, the molded material 26 may comprise a common, generally homogenous material mixture formulation forming both the friction-generating pad element 28 and the noise-damping pad element 32.

FIG. 3 illustrates another embodiment of the invention wherein the noise-damping pad element is not formed integrally with the friction-generating pad element 28. In this situation, the noise-damping pad element can be formed separately and affixed in a subsequent operation, or omitted entirely depending upon the application and circumstances. The novel advantages of the present invention are realized in the embodiment of FIG. 3 by way of the primary extrusion opening 24 in the backing plate 12 by which vibrations traveling from one end of the backing plate 12 to the other will be substantially dampened as more fully described below.

Figure 4:
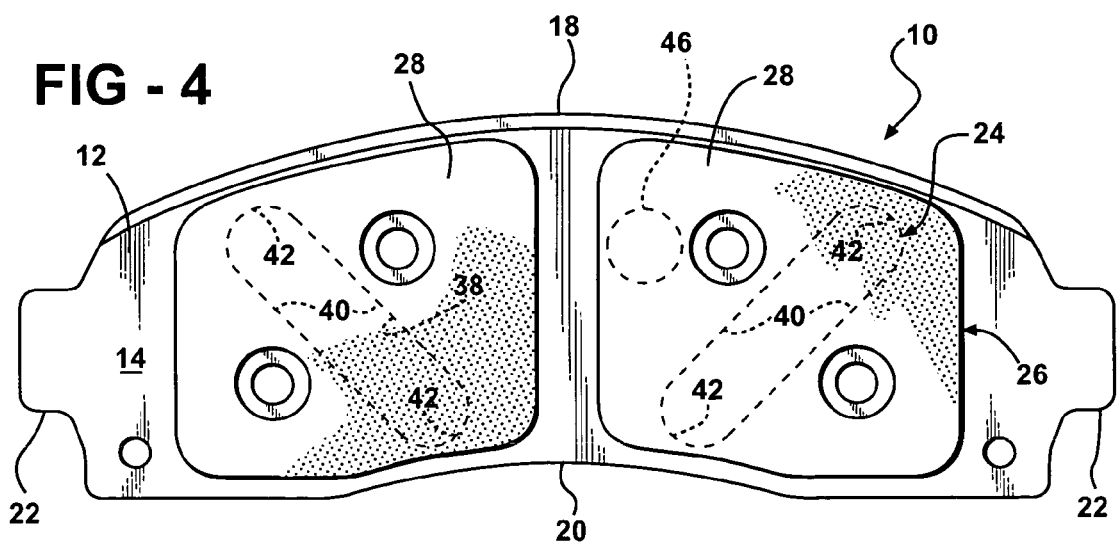
FIG. 4 is a front elevation view of a brake pad assembly of the present invention wherein the primary extrusion opening is formed in the shape of an elongated slot and a secondary extrusion opening is formed in the shape of an elongated slot non-parallel to the orientation of the primary extrusion opening.

Referring now to FIG. 4, the backing plate 12 is shown including a secondary extrusion opening 38 adjacent the primary extrusion opening 24. The secondary extrusion opening 38 is filled with the molded material 26 at the same time of filling the primary extrusion opening 24. Preferably, the secondary extrusion opening 38 also has a non-circular shape, and in the case of FIG. 4 is formed in the shape of an elongated slot having an orientation on the backing plate 12 which is mirrored, or in this case generally perpendicular to, the orientation of the primary extrusion opening 24. Although in this Figure the friction-generating pad element 28 is shown segmented with the primary 24 and secondary 38 extrusion openings associated with respective segments, it will be appreciated that this extrusion opening configuration could be equally effective with a non-segmented friction-generating pad element 28.

FIG. 5 illustrates a slightly different configuration of the extrusion openings, wherein three secondary extrusion openings 38 are formed in the backing plate 12, together with the primary extrusion opening 24. In this example, one of the secondary extrusion openings 38 is arranged as a pair with the primary extrusion opening 24 in which they take the shape of parallel elongated slots associated with a respective segment of the friction-generation pad element 28. The other two secondary extrusion openings 38 are themselves arranged as a parallel pair and associates with the other segment of the friction-generating pad element 28.

FIGS. 7 and 8 illustrate yet additional shape configurations and orientations for the primary 24 and secondary 38 extrusion openings. For example, in FIG. 7 the primary extrusion opening 24 is formed in the general shape of a "T", and the secondary extrusion opening 38 is also formed in the general shape of a "T", but mirrored in orientation to the primary extrusion opening 24. In FIG. 8, the primary extrusion opening 24 is formed in the general shape of an "H", and the secondary extrusion opening 38 is also formed in the general shape of an "H", but mirrored in orientation to the primary extrusion opening 24. These foregoing examples are merely suggestive of the shape configurations possible for the extrusion openings 24, 38. And, although in each example the secondary extrusion opening 38 is shown in a mirrored orientation relative to the primary extrusion opening 24, such is not a necessary design relationship.

In all of these examples, however, the extrusion openings 24, 38 are shown including at least one linear edge 40 which has been oriented substantially non-parallel to either of the top 18 and bottom 20 edges of the backing plate 12. This feature is believed to enhance the noise-damping effects of the present invention. Specifically, vibrations traveling the length of the backing plate are substantially dampened upon encountering the non-circular shape of the extrusion openings 24, 38 and are further attenuated by reflecting off the linear edge 40.

Another beneficial feature common to the examples consists of the preferred absence of any sharp corners, both concave and convex, in the extrusion openings 24, 38. Referring again to FIGS. 4-8, each extrusion opening 24, 38 is shown including at least two concave corners 42. The concave corners 42 are provided with radii of curvature; in the preferred embodiment the radii of curvature are at least as large as the thickness of the backing plate 12 however tighter radii can be used to beneficial effect as well. Similarly, FIGS. 7 and 8 reflect examples in which each extrusion opening 24, 38 includes at least one convex corner 44. The convex corner 44 also has a radius of curvature. These radii of curvature for corners 42, 44 within the shape of the extrusion openings 24, 38 function to both reduce stress concentrations within the backing plate and facilitate the formation technique of punching with a durable, low cost tool rather than EDM or laser cutting.

The friction brake pad assembly 10 having extrusion openings 24, 38 in the backing plate 12 into which the molded material 24 are pressed during the forming operation has been found to substantially and beneficially alter the vibrations traveling from one end of the backing plate 12 to the other end. It is believed that these beneficial effects are achieved by forming the extrusion openings 24, 38 with a non-circular shape. The non-circular shapes can be optimally configured to reduce a tendency for modal locking of the brake friction pad assembly 10 during use, without overstressing the structural integrity of the backing plate 12. Different numbers, configurations, and placements of the extrusion openings 24, 38 in the backing plate 12 have different noise attenuating benefits during brake applications. Preferably, the number, configuration, and placement of the extrusion openings 24, 38 are selected and perfected to alter the natural vibrational frequency of the backing plate 12, and thus reduce the tendency for modal locking of the brake components, which is likely a source of brake noise during vehicle brake usage. An additional benefit of the large surface area occupied by the extrusion openings 24, 38 in the backing plate 12 is the increased amount of noise-damping material 26 present on the brake assembly 10.

Obviously, many modifications and variations of the present invention are possible in light of the above teachings. For example, the novel features of the invention can be practiced in combination with one or more prior art style circular openings in the backing plate 12. For example, as shown in FIG. 4, the non-circular extrusion opening 24 can be paired with a circular opening 46 to achieve added benefit, and thereby take the form of a second extrusion opening. It is, therefore, to be understood that within the scope of the appended claims, the invention may be practiced otherwise than as specifically described. The invention is defined by the claims.

What is claimed is:

1. A brake friction pad assembly comprising:
a rigid backing plate having a thickness between opposed first and second faces, and being capable of transmitting vibrations across said opposed faces, said backing plate including a top edge and bottom edge spaced from said top edge, said top and bottom edges extending lengthwise of said backing plate;
said backing plate including a primary extrusion opening fully bounded on all edges thereof and extending between said opposed faces;
a friction-generating pad element made from a molded material and pressed into contact with said first face of said backing plate such that said molded material fills said primary extrusion opening;
a noise-damping pad element which overlies and contacts a substantial portion of said second face of said backing plate, said noise-damping pad element being joined to said friction-generating pad element by said molded material contained within said primary extrusion opening; and
said primary extrusion opening having a non-circular shape whereby vibrations traveling across said backing plate are substantially dampened upon encountering said non-circular shape of said primary extrusion opening, said primary extrusion opening including at least one linear edge, said linear edge oriented non-parallel and non-perpendicular to either of said top and bottom edges of said backing plate, and said primary extrusion opening further including at least one convex corner.

2. The brake friction pad assembly of claim 1 wherein said molded friction-pad element and said molded noise-damping pad element are fabricated from a common, generally homogenous material mixture formulation.

3. The brake friction pad assembly of claim 1 wherein said molded friction-pad element is fabricated from a first material mixture formulation, and said molded material contained within said primary extrusion opening and noise-damping pad element are fabricated from a common, generally homogenous second material mixture formulation having more readily flowable extrusion properties than said first material mixture formulation.

4. The brake friction pad assembly of claim 1, further including a secondary extrusion opening in said backing plate adjacent said primary extrusion opening and filled with said molded material.

5. The brake friction pad assembly of claim 4 wherein said secondary extrusion opening has a non-circular shape.

6. The brake friction pad assembly of claim 4 wherein said primary extrusion opening comprises a first opening having a primary orientation; and said secondary extrusion opening having a secondary orientation different than said primary orientation.

7. The brake friction pad assembly of claim 1 wherein said primary extrusion opening defines an elongated slot.

8. The brake friction pad assembly of claim 7, further including a secondary extrusion opening in said backing plate adjacent said primary extrusion opening and filled with said molded material, said secondary extrusion opening defining an elongated slot oriented generally perpendicular to said primary extrusion opening.

9. The brake friction pad assembly of claim 7, further including a secondary extrusion opening in said backing plate adjacent said primary extrusion opening and filled with said molded material, said secondary extrusion opening defining an elongated slot oriented generally parallel to said primary extrusion opening.

10. The brake friction pad assembly of claim 1 wherein said first face of said backing plate is generally planar, and second face of said backing plate is generally planar and parallel to said first face.

11. The brake friction pad assembly of claim 1 wherein said primary extrusion opening is generally T-shaped.

12. The brake friction pad assembly of claim 1 wherein said primary extrusion opening is generally H-shaped.

13. The brake friction pad assembly of claim 1 wherein said non-circular shape of said primary extrusion opening is configured to reduce a tendency for modal locking of said brake friction pad assembly during use.

14. The brake friction pad assembly of claim 1 wherein said backing plate includes at least two spaced mounting features for operative support within a brake caliper system, said mounting features being disposed on opposite sides of said primary extrusion opening.

15. The brake friction pad assembly of claim 14 wherein said spaced mounting features comprise lug-shaped ears extending in opposite lengthwise directions from said backing plate.

* * * * *